United States Patent [19]

Zürrer et al.

[11] 4,009,822
[45] Mar. 1, 1977

[54] WEIR IN A PATH OF CONVEYANCE

[75] Inventors: Hans Zürrer, Esslingen, Switzerland; Martin Baram, Brondby Strand, Denmark

[73] Assignee: Escher Wyss Limited, Zurich, Switzerland

[22] Filed: Aug. 26, 1975

[21] Appl. No.: 607,884

[30] Foreign Application Priority Data

Sept. 2, 1974 Switzerland ............... 011888/74

[52] U.S. Cl. ................................................. 233/3
[51] Int. Cl.² ...................................... B04B 11/04
[58] Field of Search .................. 233/3, 9, 20 R, 27, 233/28

[56] References Cited

UNITED STATES PATENTS

| | | | |
|---|---|---|---|
| 2,186,836 | 1/1940 | McGlaughlin | 233/27 X |
| 3,771,715 | 11/1973 | Baram | 233/27 |
| 3,930,608 | 1/1976 | Baram | 233/3 |

*Primary Examiner*—George H. Krizmanich
*Attorney, Agent, or Firm*—Robert A. Ostmann

[57] ABSTRACT

A weir arranged on a longitudinal section of the bottom of an upwardly open path of conveyance, e.g. a centrifugal drum or a conveyor channel; the weir is formed of a membrane which divides off from the material being transported a pressure medium chamber which is arranged at the bottom of said path, extends transversely relatively to the direction of transport of the path and can be subjected to pressure by admission of a pressure medium. The membrane forming the weir can be stiffened to resist to considerable forces acting.

4 Claims, 4 Drawing Figures

WEIR IN A PATH OF CONVEYANCE

BACKGROUND OF THE INVENTION

The invention relates to a weir which is arranged on a longitudinal bottom portion of an upwardly open path of conveyance before the discharge end of the said path.

The invention has as its object to provide for an upwardly open path of conveyance a weir which reliably holds back the material being transported along the path, can be lowered in a simple manner and, when lowered to the bottom of the path, presents as little resistance as possible to the material being transported.

SUMMARY OF THE INVENTION

In a weir of the kind described initially, this object is achieved according to the invention in that the weir is formed of a membrane which divides off from the material being transported a pressure medium chamber arranged at the bottom of the path and transversely to the direction of conveyance of the path; said chamber can be subjected to pressure by admitting a pressure medium into it.

When pressure is introduced into the pressure medium chamber, such a membrane arches towards the material being transported and retains it safely and in sealing-tight manner. Such a weir can be lowered in a simple manner, since when pressure is not applied to the pressure medium chamber the membrane constituting the weir lies down on the bottom of the path of conveyance, and thus presents substantially no resistance to the material being transported. If considerable forces act on the weir due to the action of the material transported it is advantageous if, as viewed in a longitudinal sectional view through the path of conveyance, the membrane comprises two parts, of which the part situated first in the direction of transport is stiffened in the longitudinal direction over a length which amounts to up to one length of the longitudinal bottom portion, and if the membrane is left flexible at the two edges of the stiffened part.

The membrane can advantageously be used to form a weir in a centrifugal drum for centrifuged material, being arranged in an annular situation on the drum wall, and the drum can also be made conical, widening in the direction of transport.

The membrane can also advantageously be arranged in a conveyor trough or channel to form a weir for material being transported.

BRIEF DESCRIPTION OF THE DRAWING

The subject of the invention will be described and explained in detail hereinafter with the help of the drawings, wherein.

DESCRIPTION OF THE PREFERED EMBODIMENTS

Figure 1:
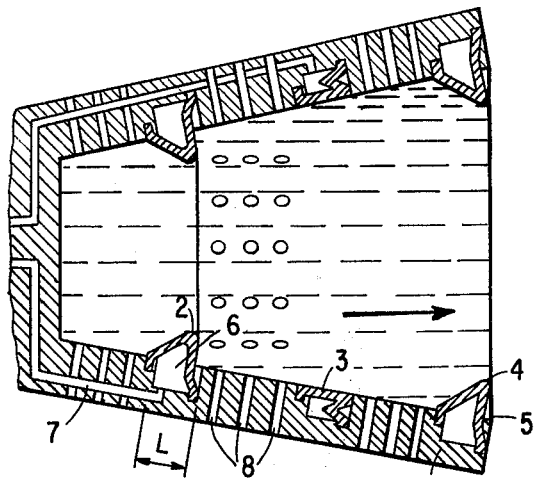
FIG. 1 shows a first constructional example in longitudinal section.

The upwardly open path of conveyance shown in FIG. 1 is a centrifugal drum 1, which is given a conical shape widening in the direction of transport (arrow). At some longitudinal portions of the said path L membranes 2, 3 and 4 are arranged so as each to form a weir or barrier before the discharge end of the path of conveyance, in this case the drum 1. Each membrane divides off from the material being transported towards the discharge end 5, that is to say, the material being centrifuged, a pressure medium chamber which is designated as 6. The said material being precipitated on the drum casing because of the action of centrifugal forces. The pressure medium chamber 6 is connected in each case to a conduit 7 for a pressure medium, and can be subjected to the action of this pressure medium. In the drawings only one pressure medium conduit designated as 7 is visible. Similar conduits lead to the other pressure medium chambers.

Each pressure medium chamber is arranged at the bottom of the path of conveyance, that it is say the casing or shell of the drum 1, and extends transversely relatively to the direction of transport, in an annular formation in other words in the form of a closed ring on the periphery of the centrifugal drum 1.

When pressure is admitted to the pressure medium chamber 6 the membrane defining the pressure medium chamber 6, as designated in the drawings as 2 or 4, arches away from the drum 1 and forms a weir retaining the material being centrifuged, which is thus held in the drum portion thus constituted, until a filtrate has been centrifuged away through bores 8 provided in the bottom. When the pressure medium is discharged from the pressure medium chamber 6 through the conduit 7 the membrane —as the membrane designated here as 3— descends under the action of centrifugal forces towards the drum casing, and the material is transported away along the drum casing towards the discharge end 5 by the action of centrifugal forces.

Figure 2:
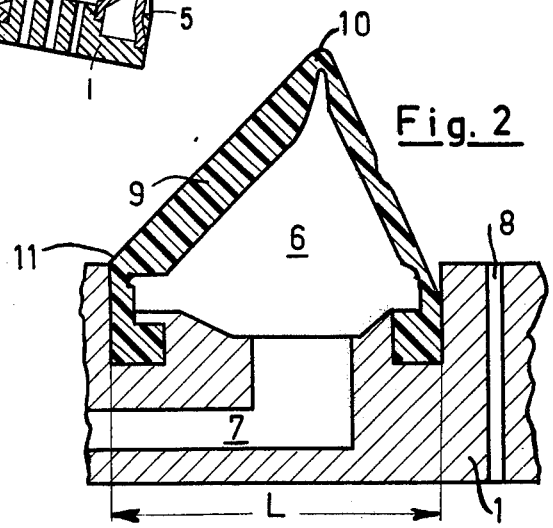
FIG. 2 shows a detail from FIG. 1 on a larger scale.

To make it possible to accept more satisfactorily the relatively great forces acting on the membrane forming weir in this case, the membrane comprises, as FIG. 2 shows more particularly, two parts of which the part 9 which is situated first considered in the direction of transport (arrow) is given a stiffened construction. The stiffening or reinforcement is aligned longitudinally and extends over a length which amounts to the length of the longitudinal portion L over which the membrane is arranged.

The length of the stiffening could also amount to less than the length L.

At the two edges 10 and 11 of the stiffened part 9 the membrane is left flexible in order to allow the pivoting of the stiffened part 9 relatively to the drum bottom surface.

The membranes 2, 3 and 4 and the pressure medium chambers 6 need not always be completely annular i.e. in the form of a closed ring.

They could also be only roughly ring-shaped, for example extending along a helical line round the casing. The membranes or pressure medium chambers could also be sub-divided into ring segments.

In the case of a centrifuge with a conical drum it would also be conceivable to arrange a membrane according to the present invention on a longitudinal portion which was very large relatively to the drum length, and which could amount to approximately the whole casing length of the drum. In this way it would be possible to vary the conical shape of the drum e.g. to give it a cylindrical form or in addition extending to a conical form narrowing towards the discharge end, thus regulating the retaining of the material and its discharge.

Figure 3:
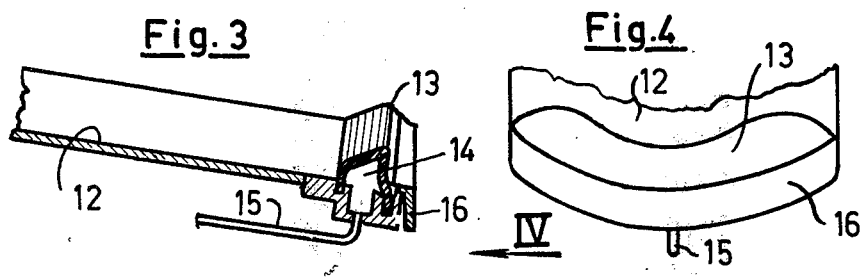
FIG. 3 shows a further constructional example in longitudinal section.
Figure 4:
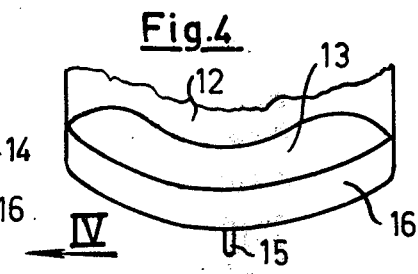
FIG. 4 shows a view in the direction of the arrow IV to FIG. 3.

The upwardly open path of conveyance shown in FIGS. 3 and 4 is a conveyor channel 12. To dam back a material being transported in the channel a membrane 13 is arranged as a weir. 15 designated a pressure medium conduit leading to a pressure medium chamber 14. The discharge end of the channel 12 is provided with a rail 16. Only one end portion of the conveyor channel is shown in the drawings.

It is possible to give the conveyor channel a U-shaped half-round profile, or a U-shaped profile with a straight bottom.

We claim:

1. The combination of an upwardly open path of conveyance which declines in the direction of conveyance and along which material is being transported, and a weir apparatus for selectively blocking such transport, the weir apparatus comprising a pressure medium chamber located at the bottom of said path and extending across the direction of transport; and a membrane which overlies the chamber and seals it from said material, the membrane having a position of repose, in which it lies along the bottom of said path and permits material movement along the path, and an arched position to which it is moved by pressure in the chamber and in which it impedes transport of material along the path, the membrane having two successive parts in the direction of transport which are so arranged that, in said position of repose, the upstream part overlies the downstream part and effectively isolates it from the material being transported, and, in said arched position, the upstream part faces in a direction opposite to the direction of transport, whereby material overlying the membrane when the latter is arched is urged in the upstream, rather than the downstream direction.

2. Apparatus as defined in claim 1 in which said upstream part of the membrane is stiffened longitudinally over a length up to the extent of the chamber in said direction, and the membrane is flexible at the two margins of the stiffened part.

3. Apparatus as defined in claim 1 in which the path of conveyance is a concially shaped drum of a centrifuge which widens in the direction of transport, and the weir apparatus is ring-shaped and serves to impede transport of material being centrifuged.

4. Apparatus as defined in claim 1 in which the path of conveyance is an upwardly open conveyor channel which slopes downward in the direction of transport, and the weir apparatus serves to impede movement of material being transported in the channel.

* * * * *